United States Patent [19]

Purton et al.

[11] 3,964,516

[45] June 22, 1976

[54] FLOW CONTROL VALVE FOR DECOKING

[75] Inventors: Robert Merrill Purton; Robert Brent Maddock, both of Cerritos, Calif.

[73] Assignee: Dresser Industries, Inc., Dallas, Tex.

[22] Filed: Sept. 9, 1975

[21] Appl. No.: 611,762

[52] U.S. Cl. .................... 137/625.38; 137/625.48; 202/258
[51] Int. Cl.² .................................... F16K 47/08
[58] Field of Search ................ 137/625.48, 625.38; 202/256, 258

[56] References Cited
UNITED STATES PATENTS 2,694,413  11/1954  Force ............................. 137/625.48

FOREIGN PATENTS OR APPLICATIONS 1,050,365  9/1953  France ............................. 202/258

*Primary Examiner*—Arnold Rosenthal
*Attorney, Agent, or Firm*—Roy L. Van Winkle; John N. Hazelwood

[57] ABSTRACT

The control valve described is a three-position valve that has been designed for use in decoking operations. The hollow body of the valve has been fitted with a sleeve that includes: a plurality of apertures adjacent the inlet of the valve that are arranged in communication with a first outlet; a second plurality of apertures that are spaced from the first apertures and arranged to be in communication with the second outlet of the valve; and, a plurality of relatively large perforations that extend through the sleeve and are located between the two sets of apertures and in communication with the first outlet. An elongated valve member is movably located within the sleeve. The valve member has a passageway extending therethrough so that when the valve member is in a first position, the fluid communicates from the inlet to the second outlet of the valve providing restricted flow permitting the pump connected therewith to continue to recirculate the fluid utilized in decoking through the second set of apertures. In a second position of the valve member, the decoking fluid flows through the first apertures purging and filling the decoking lines and simultaneously flowing through the valve member outwardly through the second set of apertures for recirculation as required. In the third position of the valve member, the perforations in the sleeve are open and the second set of apertures are closed so that substantially unrestricted flow is provided through the perforations to the first outlt from the valve to provide the necessary volume and pressure to perform the decoking operation.

4 Claims, 6 Drawing Figures

FLOW CONTROL VALVE FOR DECOKING

BACKGROUND OF THE INVENTION

This invention relates generally to an improved flow control valve. More particularly, but not by way of limitation, this invention relates to an improved flow control valve having a single inlet and a pair of outlets with flow, in one operating position, being restricted and through one of said outlets, in a second operating position being restricted and through both of said outlets, and in a third operating position, being substantially unrestricted and through only one of said outlets.

As previously mentioned, the improved flow control valve of this invention is particularly suited for use in decoking operations. In the last phase of refining petroleum products, the remaining petroleum is pumped into extremely large tanks and elevated to temperatures sufficient to drive off all of the remaining volatile materials. The residue remaining in the tank after heating is substantially pure coke. To remove the coke from the tank the practice is to pump water which is at high pressure and in relatively large volumes, through nozzles located in the tank to disintegrate the coke. For example, a pump delivering water to the nozzles may be supplying the water and 2,000 gals. of water per minute and at approximately 3,000 lbs. per sq. in. pressure.

The pumps are generally driven by electric motors and may require as much as 4,000 horsepower. With such large motors it is not practical to stop the pump and motor each time it is necessary to change a nozzle or perform other operations in the tank which require discontinuation of the water flow. Therefore, it has been the practice in the past to provide several valves that are connected with each other and with the pump and arranged to provide for bypass flow when the main flow is stopped without stopping the pump and motor.

Also, because of the relatively large hoses, pipes, etc. connecting the pump with the nozzles, it is desirable to fill the pipes relatively slowly to prevent "water hammer" which could result in destruction of the system. The necessary valves and external pipes mentioned above have also provided this function.

An object of this invention is to provide an improved flow control valve which, through the medium of a single multipurpose valve can provide all of the foregoing desirable features.

SUMMARY OF THE INVENTION

The improved flow control valve of this invention comprises a hollow valve body having an inlet port and first and second outlet ports; and, a sleeve mounted in the body having an open end located adjacent to inlet port, a closed end located adjacent the second outlet port, a plurality of first apertures near the open end that extends through the sleeve and are arranged to be, at times, in communication with the inlet port, a plurality of second apertures extending through the sleeve and arranged to be, at times, in communication with the second outlet port, and a plurality of perforations extending therethrough adjacent to the first outlet and between the first and second apertures. An elongated valve member, which is movably located in the sleeve, is engageable with an annular valve seat in the body to close the valve against all but recirculating flow. A valve member in the valve has a longitudinally extending passageway therethrough providing communication between the open and closed ends of the sleeve and being of sufficient length to close the perforations. The valve also includes valve operating means connected with said valve member to move the valve member to a first position wherein the valve member is in engagement with the valve seat closing the first apertures and perforations and permitting restricted flow from the inlet port to the second outlet port. The valve member is movable to a second position wherein the first and second apertures are open permitting restricted flow from the inlet port to both the outlet ports while preventing flow through the perforations and then to a third position wherein the perforations are open and the second apertures are closed permitting substantially unrestricted flow from the inlet port through the perforations into the first outlet port while preventing flow through the second apertures into the second outlet port.

The foregoing and additional objects and advantages of the invention would become more apparent as the following detailed description is read in conjunction with the accompanying drawing.

DETAILED DESCRIPTION OF THE PREFERRED EMBODIMENT

Figure 1:
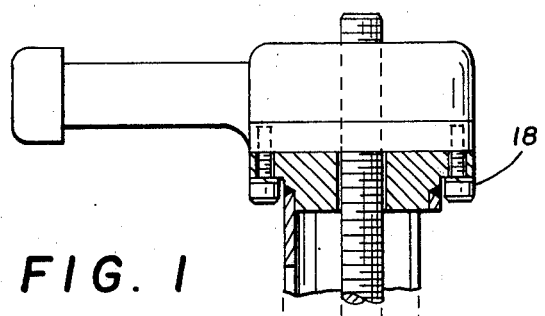
FIG. 1 is a cross-sectional view of a valve constructed in accordance with the invention.
Figure 4:
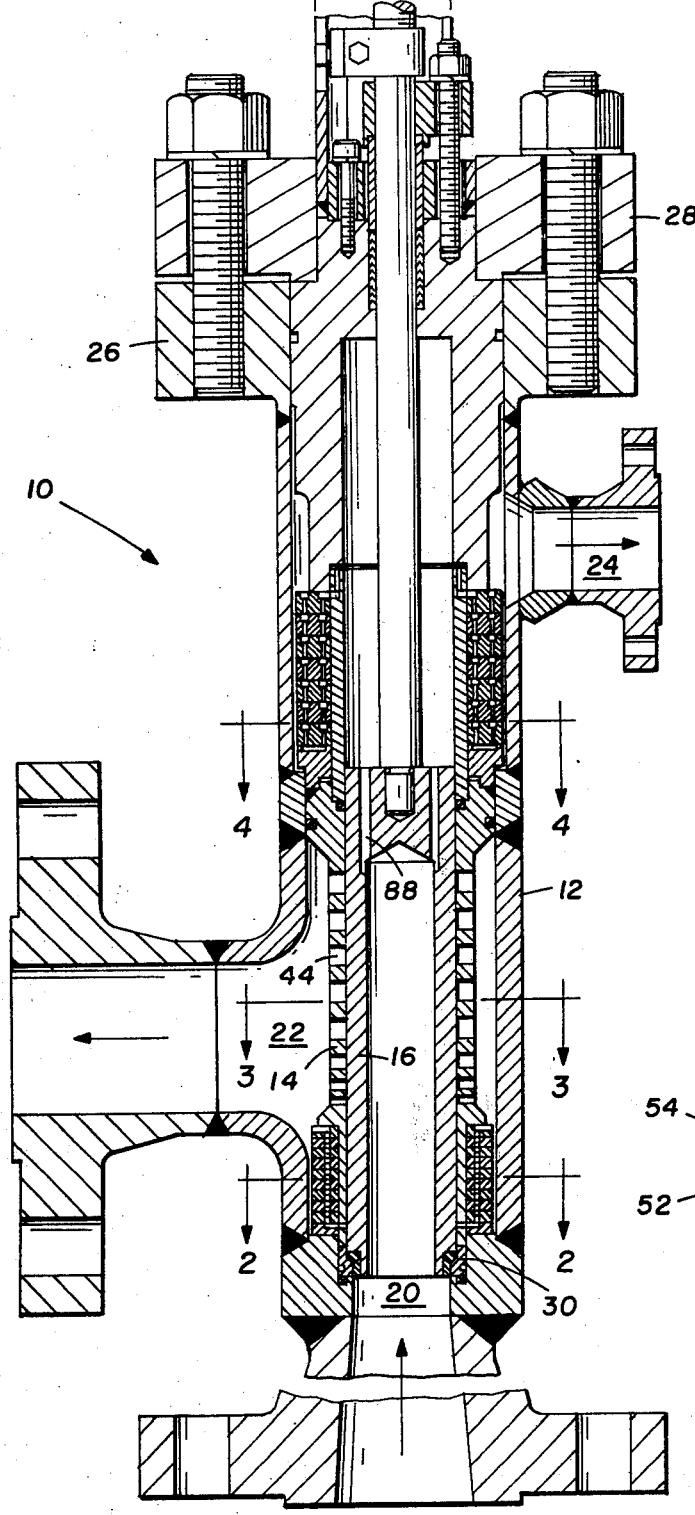
FIG. 4 is a cross-sectional view taken substantially along the line 4—4 of FIG. 1.
Figure 4:
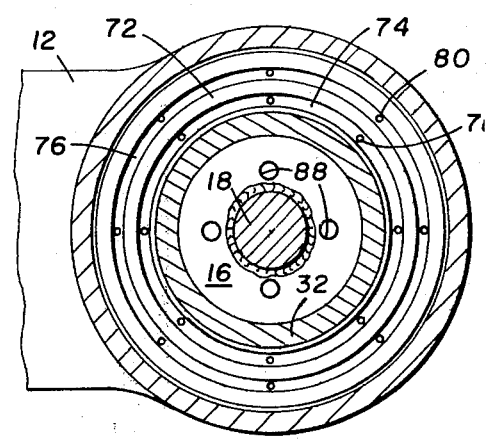
Figure 3:
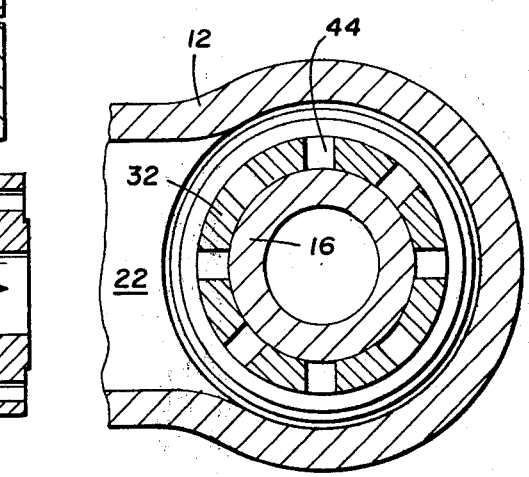
FIG. 3 is a cross-sectional view taken substantially along the line 3—3 of FIG. 1.
Figure 2:
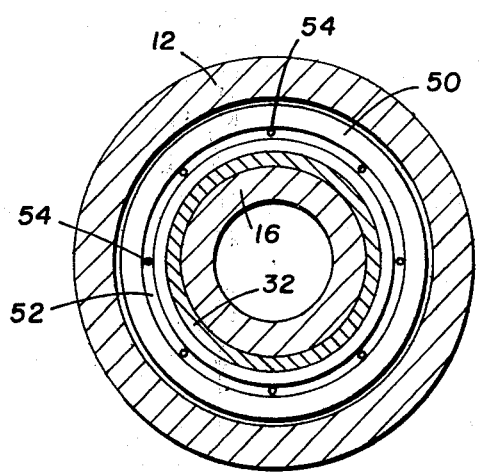
FIG. 2 is a cross-sectional view taken substantially along the line 2—2 of FIG. 1.

Referring to drawing and FIG. 1 in particular, shown therein and generally designated by the reference character 10, is a flow control valve constructed in accordance with the invention. The flow control valve 10 includes a hollow valve body 12, a flow control or sleeve assembly 14 located within the body 12, an elongated valve member 16 movably positioned within the sleeve assembly 14, and a valve operating assembly 18 that is connected with the valve member 16 for moving the valve member 16.

The body 12 includes an inlet port 20, a main outlet port 22 and a secondary or recirculating outlet port 24. Each of the inlet and outlet ports is illustrated as being provided with a flanged connector for connecting the valve with pipes (not shown) that are necessary to carry out the operation of the valve. However, it will be understood that any suitable means for connecting the valve, such as threaded fittings, may be utilized if desired.

The opposite end of the body 12 from the inlet port 20 carries a flanged connector 26 that, in conjunction with a mating flange ring 28, retains the sleeve assembly 14 in the housing 12.

Positioned in the interior of the housing 12 in encircling relationship to the inlet port 20 is an annular valve seat 30. The valve seat 30 is illustrated as being a separate member, but if desired, can be formed as an integral portion of the housing 12.

The sleeve assembly 14 includes a tubular member 32 having an open end 34 engaging the valve seat 30 and encircling the inlet port 20. The tubular member 32 also has a closed end 36 that is disposed within the flange ring 26. The tubular member 32 is illustrated as being constructed from a number of components for ease of manufacture and assembly. On the exterior of the tubular member 32, a radially projecting flange 38 is provided that sealingly engages the housing 12, preventing fluid communication between the outlet port 22 and the outlet port 24.

The tubular member 32 is provided, adjacent the inlet port 20, with a plurality of apertures 40 that extend radially therethrough for purposes that will be explained more fully hereinafter. The tubular member 32 is also provided with an annular orifice or recess 42 that is located between the flange 38 and the closed end 36 thereof. The purpose of the annular orifice 42 will also be explained more fully hereinafter.

The tubular member 32 also includes a plurality of radially oriented perforations 44 that are located adjacent the outlet port 22 between the open end 34 of the tubular member 14 and the flange 38 thereon. As illustrated most clearly in FIG. 5, the perforations 44 are relatively large as compared to the apertures 40 and the annular recess 42. In the preferred form of the invention, the perforations 44 are graduated in size with the smaller perforations being located closer to the inlet port 20. The annular recess 42 is of less width than any other portion of the flow passageway through the valve 10 to prevent the entrance of foreign matter that could plug the valve.

The sleeve assembly 14 also includes a first annular member 46 encircling a tubular member 32 and having an annular recess 48 therein that is in communication with the apertures 40. A plurality of annular members 50 encircle the tubular member 32 in stacked relationship and each includes an annular groove 52 aligned with the annular groove 48 in the member 46 and a plurality of orifices 54 that extend through the members 50 in the annular groove 52 in communication with each other and with the annular groove 48 in the member 46. An additional annular member 56 includes a plurality of orifices 58 that are in communication with the orifices 54 in the annular grooves 52. An annular groove 60 formed in the member 56 is in communication with the orifices 58 and with the outlet port 22 of the valve 10. The arrangement of the annular members 46, 50 and 56 is such that fluid entering the inlet port 20 (when the valve member 16 is off the seat 30) passes through the apertures 40 and through the annular members 46, 50 and 56 to the outlet port 22.

The sleeve assembly 14 further includes a disk member 62 havng an annular recess 64 that is in communication with the annular recess 42 in the tubular member 32. A plurality of radially spaced orifices 66 extend through the annular disk member 62. A second annular groove 68 is formed in the annular disk member 62 and is arranged concentrically with the annular groove 64 previously described. A plurality of radially spaced orifices 70 extend through the annular disk member 62 from the annular groove 68.

A plurality of substantially identical, annular disk members 72 encircle the tubular member 32 in stacked relationship. Each of the annular disks 72 includes an inner annular recess 74 and an outer annular recess 76. A plurality of radially spaced orifices 78 extend through each of the disk members 72 from the annular recess 74 and a plurality of radially spaced orifices 80 extend therethrough from the outer annular recess 76. The arrangement is such that each of the orifices is in communication with a respective annular groove of adjacent annular disk members 72.

An annular disk member 82 is arranged in stacked relationship with the annular disk members 72 and includes an annular recess 84 that is in communication with all of the orifices formed in the adjacent annular disk member 72. The arrangement of the annular disk members 62, 72 and 82 is such that fluid flowing through the valve 10 passes through the annular orifice 42 into the disk member 70, through the inner orifices 66 and into and through each of the adjacent disk members 72 until it reaches the annular disk member 82. The fluid then passes through the annular recess 84 in the disk member 82 and returns through the outer orifices 80 of each of the disk members 72 whereupon the fluid flows through the orifices 70 in the disk member 62 and outwardly of the annular groove 68 therein into communication with the recirculation outlet port 24 in the housing 12.

The elongated valve member 16 is slidably disposed within the tubular member 32 and is of sufficient length to completely cover the perforations 44. One end of the valve member 16 is provided with a seal portion 86 that is arranged to sealingly engage the annular valve seat 30 in the valve housing 12. As shown in the drawings, the valve member 16 is hollow and has one end connected to the valve operating assembly 18. A plurality of passageway 88 extend through the valve member 16 permitting fluid communication therethrough adjacent the connection with the operating assembly 18.

The valve operating assembly 18 may be of any suitable type to move the valve member 16 through the sleeve assembly 14 as necessary to provide the desired flow pattern through the valve 10. The assembly 18 preferably includes a powered or manual system for moving the valve member 16 and an indicator that clearly shows the position of the valve member 16 in the housing 12.

OPERATION

To use the valve 10 in a decoking operation, the inlet 20 is connected in fluid communication with a pump (not shown) that is connected with a fluid reservoir (not shown). The outlet port 22 is connected in fluid communication with the decoking nozzles (not shown). The outlet or recirculation port 24 is connected in fluid communications with the reservoir.

Figure 5:
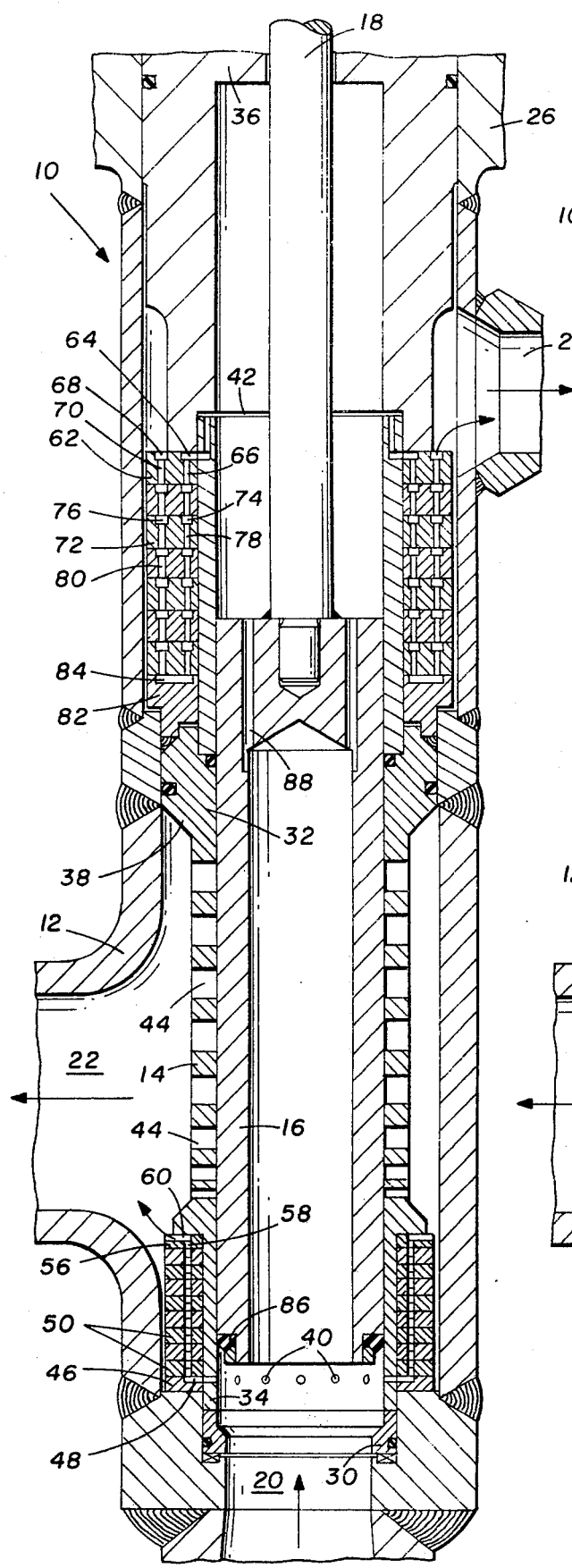
FIG. 5 is an enlarged partial, cross-sectional view similar to FIG. 1, but showing the valve in a different operating position.
Figure 6:
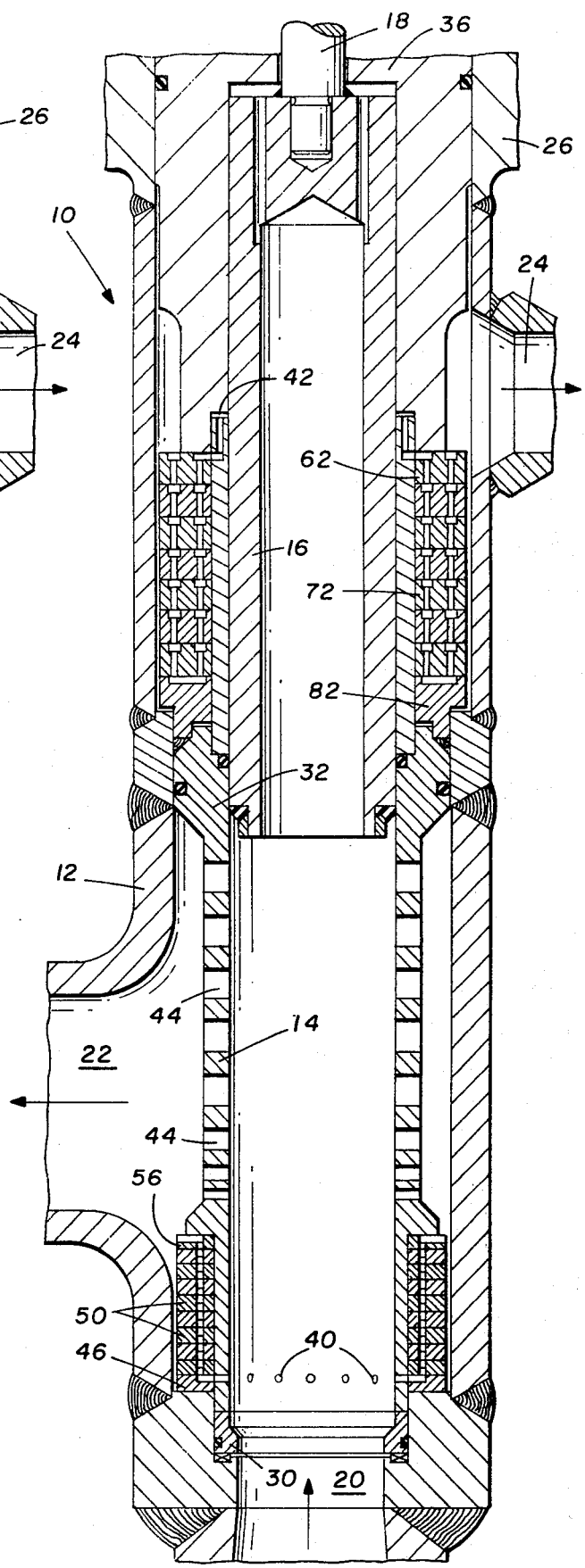
FIG. 6 is a view similar to FIG. 5, but illustrating another operating position of the valve of FIG. 1.

As previously mentioned, the valve 10 is basically a three-positioned valve although additional flow control can be obtained in the valve member 16 by restricting the number of perforations 44 that are open and by the sizing of the perforations 44. FIGS. 1, 5 and 6 illustrate the three basic positions of operation of the valve 10.

In FIG. 1, it can be seen that the valve member 16 is in sealing engagement with annular valve seat 30 thereby preventing flow from the inlet port 20 to the outlet port 22 either through the apertures 40 or through the perforations 44. With the valve member 16 in this position and the pump operating, fluid entering the inlet port 20 passes through the valve member 16 through the passageways 88 therein, outwardly through the annular orifice 42 and through the disk members 62, 72 and 82. Flow outwardly of the valve 10 is through the outlet or recirculation port 24 for return to the fluid reservoir. In this position of operation, it will be appreciated that the pump need not be shut down but that recirculation flow is accomplished and overloading of the pump or motor is avoided while at the same time preventing flow outwardly of the outlet port 22.

As previously pointed out, it is desirable also to avoid "water hammer" when filling the hoses or lines connecting the outlet port 22 with the nozzles. In the valve 10, this was accomplished by moving the valve member 16 to the position illustrated in FIG. 5. With the valve member 16 in the position shown therein, fluid entering the inlet port 20 passes through the apertures 40 into the annular members 46, 50 and 56 to the outlet port 22. As the fluid flows through the annular members 50, it passes through the orifices 54 with a consequent reduction in the pressure and volume of the fluid flowing. It will also be noted that the annular orifice 42 is not covered by the valve member 16 in this position so that excess fluid being moved by the pump passes through the valve member 16 and the passageways 88 to the recirculation port 24 as previously described for returning a portion of the fluid to the pump reservoir. Since the pressure and volume of fluid flowing into the outlet port 22 is reduced, slow filling of the lines connecting the outlet port 22 with the nozzles is accomplished and "water hammer" is avoided.

When the decoking is to begin, the valve member 16 is moved to the position illustrated in FIG. 6. Again it should be pointed out that the valve member 16 may be positioned in some intermediate location so that only a portion of the perforations 44 are exposed depending on the volume of fluid flow required. With the valve member 16 in the position illustrated in FIG. 6, fluid entering the inlet port 20 from the pump passes into the tubular member 32 and through the open perforations 44 to the outlet port 22 and to the nozzles. The apertures 40 are open, but due to the restriction offered by the annular members 50, little flow will occur therethrough. In this position of operation, the annular orifice 42, which connects the housing 12 with recirculation outlet 24, is closed by the valve member 16 and thus, no fluid will be recirculated during this phase of operation. Since the recirculation flow is stopped, and the perforations 44 are relatively large, little, if any, reduction in the pressure and volume of fluid flowing to the decoking nozzles will occur except as previously mentioned.

From the foregoing detailed description, it can be seen that the valve of this invention, while relatively simple in manufacture and operation, provides all the functions that were previously obtained by the use of multiple valves and the relatively complex pipe manifold interconnecting such valves.

Having but described a single embodiment of the invention, it will be understood that many changes and modifications can be made thereto without departing from the spirit and scope of the invention.

The embodiments of an invention in which an exclusive property or privilege is claimed are defined as follows:

1. An improved flow control valve comprising:
   a hollow valve body having an inlet port and first and second outlet ports;
   sleeve means mounted in said body having an open end located adjacent said inlet port, a closed end located adjacent said second outlet port, a plurality of first apertures near said open end extending through said sleeve means and arranged to be, at times, in communication with said inlet port, a plurality of second apertures extending through said sleeve means and arranged to be, at times, in communication with said second outlet port, and a plurality of perforations extending therethrough adjacent said first outlet and between said first and second apertures;
   an annular valve seat in said body encircling said inlet port;
   an elongated valve member movably located in said sleeve, said valve member having a longitudinally extending passageway therethrough providing communication between the open and closed ends of said sleeve and being of sufficient length to close said perforations, said valve member being engageable with said valve seat to prevent flow from said inlet port to said first outlet port;
   valve operating means operably connected with said valve member for moving said valve member to a first position in engagement with said seat wherein said first apertures and perforations are closed to flow and said second apertures are open permitting restricted flow from said inlet port to said second outlet port, to a second position wherein said first and second apertures are open permitting restricted flow from said inlet port to both said outlet ports while preventing flow through said perforations, and to a third position wherein said perforations are open and said second apertures are closed permitting substantially unrestricted flow from said inlet port through said perforations into said first outlet port while preventing flow through said second apertures into said second outlet port.

2. The valve of claim 1 wherein said sleeve means includes:
   a tubular member in said body forming an annular space therebetween and having a radially projecting flange intermediate the ends thereof, said flange sealingly engaging said body between said outlet ports preventing communication therebetween, said plurality of perforations extending through said tubular member adjacent to said first outlet port, said plurality of first apertures extending through said tubular member between said perforations and said open end, and an annular recess in the interior of said tubular member between said closed end and said perforations, said recess having a width smaller than the smallest of said second apertures.

3. The valve of claim 2 wherein said sleeve means also includes:
   a first annular member encircling said tubular member and having an annular groove in one surface thereof in communication with said first apertures;
   a second annular member encircling said tubular member and having a plurality of circumferentially spaced orifices aligned with the annular groove in said first annular member and extending into an annular groove in the opposite surface of said second annular member; and,
   a third annular member encircling said tubular member having a plurality of circumferentially spaced orifices aligned with the annular groove in said second annular member, said orifices extending into an annular groove in the opposite surface of said third annular member, said annular members providing restricted fluid flow from said inlet port, through said first apertures, the orifices in said first, second amd third annular members to said first outlet port when said valve member is in said second position.

4. The valve of claim 3 wherein said sleeve means also includes:

a first disk member encircling said tubular member and having a pair of circumferentially spaced, annular grooves in one surface, the innermost said groove being located in fluid communication with said second apertures, said first disk member also having a plurality of radially spaced orifices extending therethrough in each said annular groove;

a second disk member encircling said tubular member and having a pair of circumferentially spaced annular grooves in alignment with the orifices in said first disk member, said second disk member having a plurality of radially spaced orifices extending therethrough in each said annular groove; and, a third disk member encircling said tubular member and having an annular groove in one surface thereof aligned with the orifices in said second disk member, said disk members providing restricted fluid flow through said valve member from said inlet through said second apertures, the orifices in the innermost annular grooves of said first and second disk members, through the groove in said third disk member, and the orifices in the outermost grooves of said second and first disk member into said second outlet port.

* * * * *